US010185638B2

(12) United States Patent
Duan

(10) Patent No.: US 10,185,638 B2
(45) Date of Patent: Jan. 22, 2019

(54) CREATING ADDITIONAL SECURITY CONTAINERS FOR TRANSPARENT NETWORK SECURITY FOR APPLICATION CONTAINERS BASED ON CONDITIONS

(71) Applicant: NeuVector, Inc., San Jose, CA (US)

(72) Inventor: Gang Duan, San Jose, CA (US)

(73) Assignee: NEUVECTOR, INC., Milpitas, CA (US)

(*) Notice: Subject to any disclaimer, the term of this patent is extended or adjusted under 35 U.S.C. 154(b) by 163 days.

(21) Appl. No.: 15/151,461

(22) Filed: May 10, 2016

(65) Prior Publication Data

US 2017/0093923 A1 Mar. 30, 2017

Related U.S. Application Data

(60) Provisional application No. 62/234,609, filed on Sep. 29, 2015.

(51) Int. Cl.
*G06F 9/46* (2006.01)
*G06F 11/20* (2006.01)
(Continued)

(52) U.S. Cl.
CPC ...... *G06F 11/2033* (2013.01); *G06F 11/1658* (2013.01); *H04L 63/10* (2013.01); *H04L 63/1408* (2013.01); *G06F 2009/45587* (2013.01); *G06F 2009/45595* (2013.01); *G06F 2221/2113* (2013.01); *H04L 63/02* (2013.01); *H04L 63/0209* (2013.01);
(Continued)

(58) Field of Classification Search
CPC ....... H04L 63/20; H04L 63/105; H04L 63/14; H04L 63/1408; H04L 63/1416; H04L 63/1425; H04L 63/1441; H04L 63/02; H04L 63/0272; H04L 63/0281; G06F 2009/4557; G06F 2009/45558; G06F 2009/45562; G06F 2009/45566; G06F 2009/45595; G06F 2009/45587; G06F 2221/2113; G06F 2221/2149
See application file for complete search history.

(56) References Cited

U.S. PATENT DOCUMENTS 7,055,173 B1 * 5/2006 Chaganty ............ H04L 41/0654
726/11
9,674,147 B2 * 6/2017 Grant .................. H04L 63/0263
(Continued)

*Primary Examiner* — Joseph O Schell
(74) *Attorney, Agent, or Firm* — Fenwick & West LLP

(57) ABSTRACT

A security container of a container environment monitors a resource load in a container environment, the container environment including a container service providing operating system-level virtualization for one or more application containers connected to a virtual switch within the container environment, the one or more application containers having their traffic intercepted by the security container for inspection. The security container activates, in response to determining that the monitored resource load meets a condition in a network load policy, a new security container. The security container determines a subset of the one or more application containers to be associated with the new security container, and transfers the network connections and network sessions of the subset of the one or more application containers to the new security container.

17 Claims, 7 Drawing Sheets

(51) Int. Cl.
*H04L 29/06* (2006.01)
*G06F 11/16* (2006.01)
*G06F 9/455* (2018.01)

(52) U.S. Cl.
CPC ...... *H04L 63/0281* (2013.01); *H04L 63/1441* (2013.01); *H04L 63/20* (2013.01)

(56) References Cited

U.S. PATENT DOCUMENTS

| | | | | |
|---|---|---|---|---|
| 9,705,923 | B2* | 7/2017 | Banerjee | H04L 63/20 |
| 2003/0131262 | A1* | 7/2003 | Goddard | H04L 63/0218 |
| | | | | 726/11 |
| 2011/0314534 | A1* | 12/2011 | James | G06F 21/53 |
| | | | | 726/9 |
| 2014/0164619 | A1* | 6/2014 | Zhu | G06F 9/45558 |
| | | | | 709/226 |
| 2015/0143501 | A1* | 5/2015 | Cherukuri | H04L 63/02 |
| | | | | 726/11 |
| 2016/0182540 | A1* | 6/2016 | Ghosh | G06F 21/55 |
| | | | | 726/23 |

* cited by examiner

CREATING ADDITIONAL SECURITY CONTAINERS FOR TRANSPARENT NETWORK SECURITY FOR APPLICATION CONTAINERS BASED ON CONDITIONS

CROSS REFERENCE TO RELATED APPLICATION

This application claims the benefit of U.S. Provisional Application No. 62/234,609, filed Sep. 29, 2015, which is incorporated by reference in its entirety.

FIELD OF ART

The disclosure generally relates to the field of network containerization, and specifically to non-intrusive and transparent security monitoring of containerized services.

BACKGROUND

A recent development in networked infrastructure is the container model. In the container model, a kernel of an operating system (e.g., Linux) allows for multiple isolated user-space instances, or "containers," executing simultaneously. Each container is isolated from other containers, and may access a set of resources that are isolated from other containers. Each container also interacts with a container service, which may provide various functions, such as an application programming interface (API) to allow each container to access various functions of the container service (e.g., establishing communications, communicating with other containers, logging). One advantage of such a container system is the ability of the container system, with the assistance of the container service, to quickly and transparently migrate containers between hardware servers during live operation, e.g., for load balancing. Another advantage is that, since virtual emulation of resources, such as in a virtual machine (VM) environment, is not being performed to provide resources to the containers, the overhead compared to a VM-based environment is much lower. However, with this new container system, network security becomes a challenge with the multiple containers. Hence, what was lacking, inter alia, were systems and methods for monitoring network security in a containerized network while supporting a non-intrusive behavior and transparency.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
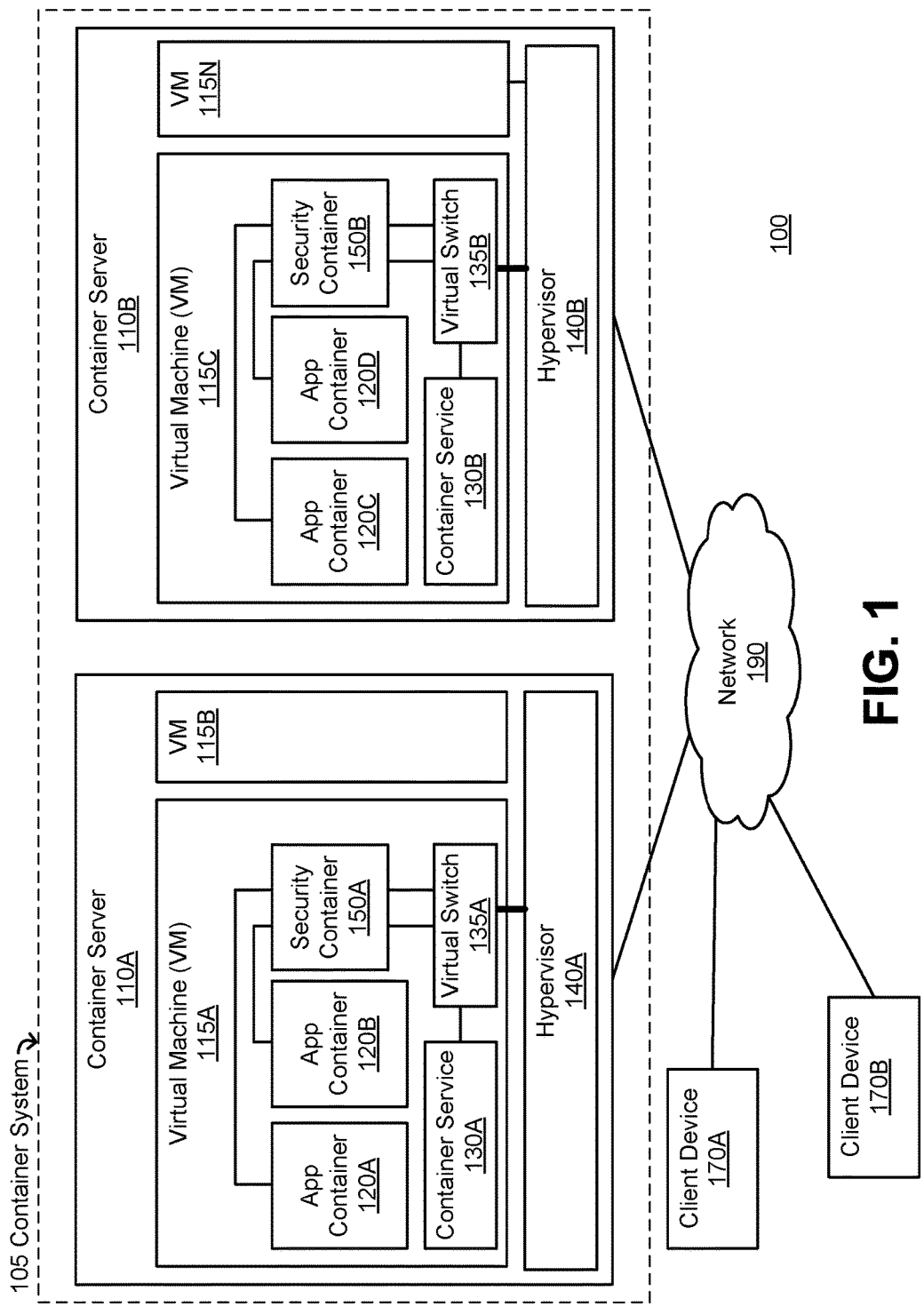
FIG. 1 illustrates an example environment capable of network security in a container system, according to an example embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is a system for network security monitoring in a container environment. In one embodiment, the security container monitors a resource load in a container environment. The container environment includes a container service providing operating system-level virtualization for one or more application containers connected to a virtual switch within the container environment. Additionally, the one or more application containers have their traffic intercepted by the security container for inspection.

The security container activates the new security container in response to determining that the monitored resource load meets a condition in a network load policy. For example, the processor load in the container environment may have exceeded a set threshold. The security container determines a subset of the one or more application containers to be associated with the new security container, transferring the network connections and network sessions of the subset of the one or more application containers to the new security container. The new security container is able to share the load with the existing security container.

The security container may also determine that a high availability (HA) policy indicates that HA is enabled. If so, the security container activates a new standby security container. The security container synchronizes one or more network sessions of the existing security container with the new standby security container. If the security container determines that it is in an error condition it initializes the new standby security container as a primary security container, and deactivates.

The security container may determine that an intercepted suspicious network activity violates a quarantine policy. In response, the security container activates a new security container in quarantine mode, and transfers one or more network connections and network sessions of application containers associated with the suspicious network activity to the new security container.

The security container may also determine at the existing security container, that an upgrade is available for the existing security container. In response, the security container activates a new security container with an upgraded image, and transfers the network connections and network sessions of the existing security container to the new security container.

Example Container System with Network Security

Figure (FIG. 1 illustrates an example environment 100 capable of network security in a container system, according to an example embodiment. The environment 100 includes the network 190, one or more client devices 170, one or more container servers, e.g., 110A, 110B (generally, 110) of a container system 105, with each container server 110 including one or more application ("app") containers, e.g., 120A, 120B (generally 120) and a security container 150. Although the illustrated environment 100 includes the elements shown in FIG. 1, in other embodiments the environment 100 may include different elements. Furthermore, the functionalities of each element may be distributed differently among the elements in other embodiments.

The network 190, which can be wired, wireless, or a combination thereof, enables communications among the client devices 170 and the one or more container servers 110 of the container system 105 and may include the Internet, a LAN, VLAN (e.g., with VPN), WAN, or other network. In one embodiment, the network 190 uses standard communications technologies and/or protocols, such as Hypertext transfer Protocol (HTTP), Transmission Control Protocol/Internet Protocol (TCP/IP), Uniform Resource Locators (URLs), and the Domain Name System (DNS). In another embodiment, the entities can use custom and/or dedicated data communications technologies instead of, or in addition to, the ones described above.

The client devices 170 may be electronic devices used by users to perform functions such as consuming digital content, executing software applications, browsing websites hosted by web servers on the network 190, downloading files, and interacting with the container servers 110. For example, the client devices 170 may be dedicated e-readers, smartphones, wearables (e.g., smartwatches or pendants), or tablets, laptops, or desktop computers configured similar to an exemplary machine (or computing system) described with FIG. 7. A client device 170 may include one or more applications, such as a web browser, to interact with services provided by the container servers 110. Although two client devices 170 are illustrated in FIG. 1, in other embodiments the environment 100 includes more client devices 170.

Figure 7:
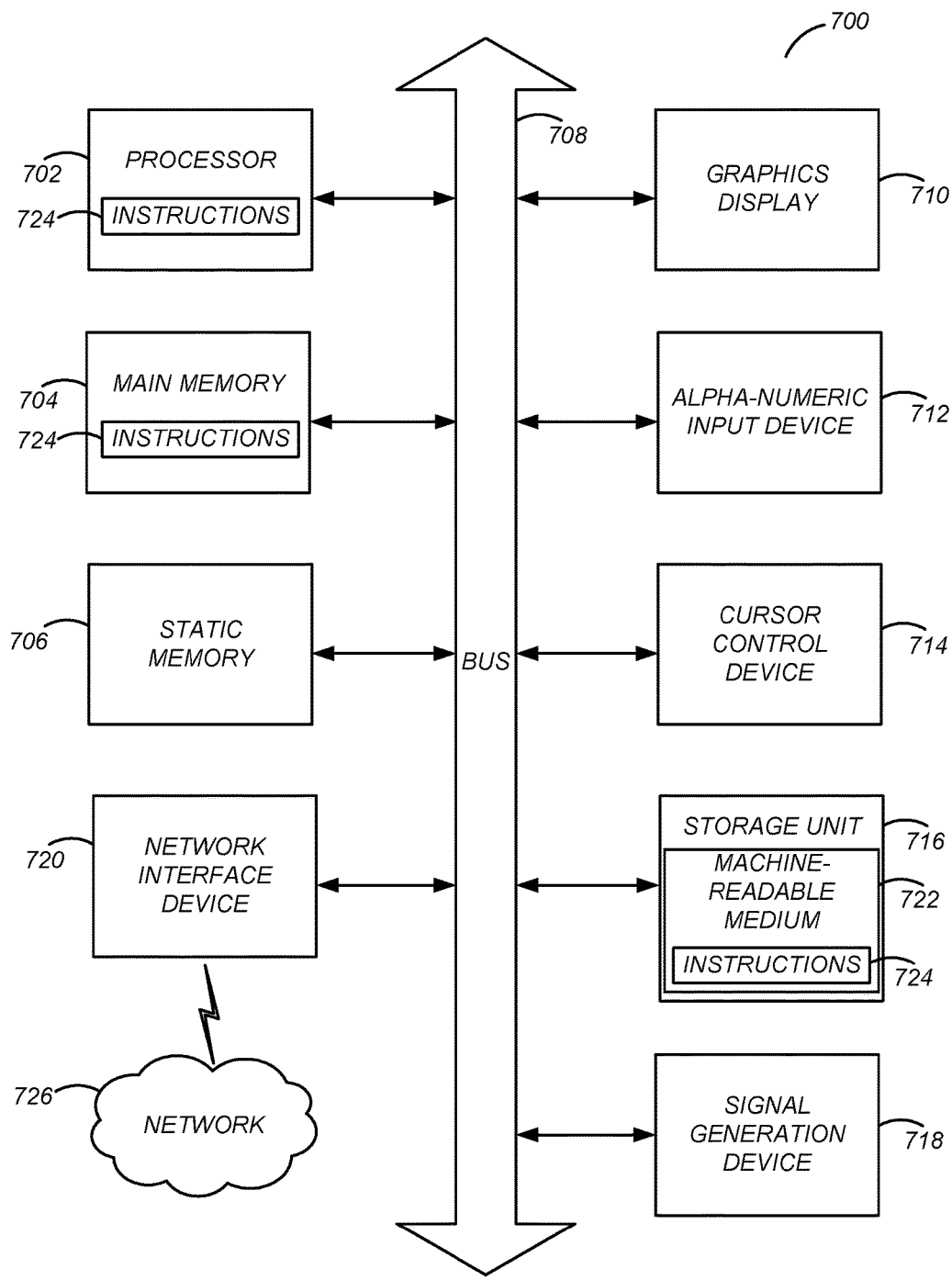
FIG. 7 is a block diagram illustrating components of an example machine able to read instructions from a machine-readable medium and execute them in a processor (or controller).

The container servers 110 may be electronic devices (similar to an exemplary machine (or computing system) described with FIG. 7) that communicate via network 190 and may execute hypervisors, virtual machines (VMs), and one or more containers. Each container server 110 may be located at a different physical location than another container server 110. However, the container servers 110 may communicate with each other via dedicated network links, such as a tunnel. This may allow services on each container server, such as the container services 130, to communicate with each other within a virtual local network. In one embodiment, the container servers 110 include an operating system that enables operating-system-level virtualization, such that the kernel of the operating system allows for multiple isolated user-space instances (i.e., "containers"). Additional details regarding such a container system is described below. In one embodiment, the container servers 110 include an operating system that enables hardware virtualization, which is a method of simulating or emulating a separate set of hardware resources on which a guest operating system or other software to executes. In such a case, the container server 110 may include one or more hypervisors 140 for hardware virtualization, on which one or more virtual machines (VMs) 115 execute.

The hypervisor 140 may be a software and/or hardware component executing on the container server 110 that creates and runs the VMs 115. The hypervisor 140 may execute directly on the hardware (e.g., processor, memory, storage, etc.) of the container server 110, may execute on an operating system of the container server 110, or may execute using a hybrid of these two (e.g., in the case of a Kernel-based Virtual Machine (KVM)). The ability to execute multiple VMs on a single hardware platform expands the capabilities of the hardware platform and simplifies management, while improving security. Furthermore, multiple different operating system versions and platforms may execute on each VM, while all using the same hardware platform.

The VMs 115 are emulations of a computer system or hardware platform. Each VM 115 emulates, either fully or partially, a set of hardware resources for a computer system. For example, the VM 115 may emulate a processor, memory, storage, graphics adapter, interrupts, and so on. Although the emulation may increase the resources needed to execute a task, and may lower efficiency, as noted, the VM 115 provides other benefits, such as the execution of multiple operating system versions and high availability, among other features.

Each VM 115 may execute an operating system that supports a container environment. As used here, container environment refers to the system or host upon which the containers are executing. In the illustrated example, the container environment is the VM 115 and operating system executing on the VM 115. However, in other cases, the container environment may be a physical system such as the container server 110 itself and the operating system executing on that container server 110.

As noted, an operating system may support a container environment by having a kernel that has enabled operating-system-level virtualization for multiple isolated containers, along with additional resource management features, which limit the resources allocated to each isolated container. For example, for each container executing within the operating system, a kernel may limit the amount of resources (e.g., memory, processor cycles) provided to that container through the use of various resource management components of the operating system (e.g., thread priority, memory allocation, etc.).

In one embodiment, the kernel may be a Linux kernel, and may support resource isolation features such as chroot, cgroups, kernel namespaces, and union-capable filesystems (e.g., aufs) in order to isolate each container. These features restrict each container's view of the operating system's resources. For example, an app container 120 may only be able to view file systems that are authorized for that app container 120. In one embodiment, the kernel may be a FreeBSD kernel, and the operating-system-level virtualization functions may be implemented in a "jail" system call. Compared to virtual machines, operating-system-level virtualization does not incur an emulation overhead, do not require a separate disk image for each container, are more resource-efficient as dedicated resources do not need to be allocated per container, may be more efficiently threaded, and so on. However, the container may still execute within a VM. Although the container environment is described here as executing within a VM 115, in another embodiment the container environment executes directly on the hardware of the container server 110.

The virtual switch 135 may emulate a hardware switch in software. In a packet-switched environment, a hardware switch receives packets with an indicated destination network address and routes these packets to an output port which is connected to a path on which the destination with the destination network address exists. The hardware switch also may support various management interfaces and protocols (e.g., quality of service (QoS). Similarly, the virtual switch 135 may provide functions that are similar to the above-described hardware switch, but instead of being implemented in hardware, the virtual switch 135 may be implemented in software (or in a hybrid software/hardware implementation). For example, the virtual switch 135 may route communications arriving at the container server 110 or VM 115 to the correct container or other service within the container server 110 or VM 115. As another example, the virtual switch 135 may route communications between containers of the same container server 110 or VM 115. The virtual switch 135 performs the routing using the network addresses of each container executing within the container server 110. While the virtual switch 135 is shown to be part of the VM 115 in the illustrated embodiment, in another embodiment the virtual switch 135 may be part of the hypervisor 140 or the VM 115 and the hypervisor 140 may each have a virtual switch.

The container service 130 is a collection of services to assist with the deployment and execution of containers on the VMs 115. Although two container services 130A and 130B are illustrated, they perform similar functions and are described together here. The container service 130 may include an application programming interface (API) for the use of software developers creating containerized software. The API may allow a software developer to easily create a containerized software application without having to implement operating system and operating system version specific functions, which are instead implemented by the container service 130. For example, the container service 130 may offer API function calls that may be used by a container to perform certain functions related to creating a container. The container service 130 may manage the isolation of resources for each container. These resources may include filesystem resources (e.g., system libraries), user and user groups, process trees (e.g., viewable processes), network resources, device resources, and inter-process communication resources (e.g., semaphores). The container service 130 may perform the isolation through the use of permissions restrictions, disk quotas, central processor unit (CPU) scheduling, input/output (I/O) scheduling, counters (e.g., beancounters), and so on.

The API of the container service 130 also may include functions to allow for a software developer to easily deploy containers on multiple hardware platforms in a distributed fashion, and for each container to be able to share data with other containers in a seamless fashion. For example, the container service 130 may allow one container to be able to access a same shared pool of data as another container through a standard API, without the need to manage the memory space directly.

The container service 130 also may be able to combine multiple container servers 110 or other hardware platforms into a single virtual host (e.g., a clustered host). The container service 130 also may include extensions to allow for easy integration with cloud services providers, such that a software developer may easily deploy a containerized application to one of these cloud services. An example of container service is Docker®.

After receiving a request from an app container 120 (e.g., via the API), the container service 130 may also create a connection between the app container 120 and the virtual switch 135. This connection includes a port pair, with one port connected to the virtual switch 135, and the other pair connected to the app container 120. This connection may include the network hardware layer address (e.g., media access control (MAC) address) and network address (e.g., Internet Protocol (IP) address) for the app container 120. This information provides the app container 120 with its own network address and isolated network path. The connection may be used by the app container 120 to route to other containers or destinations that are connected to network 190. The container service 130 also may provide the connection as a tunneled connection.

The app container 120 may be a containerized software application executing in the container system 105. In the illustrated embodiment of FIG. 1, the app container 120 is executing in the VM 115. However, in other embodiments, the app container 120 may execute directly on the container server 110 (via the operating system of the container system 115) and not within a VM. Although two app containers 120A-B are shown here, in other embodiments each VM 115 (or container server 110) may have multiple app containers. The app container 120 may include any executable code as created by a software developer. The app container 120 may include a network interface to communicate with other entities in the network 190 via the virtual switch 135. As noted, each app container 120 may be isolated from other app containers 120. Each app container 120 may thus be in its own "domain." As noted, these domains may be created using different method of operating-system-level virtualization, such as through the use of namespaces (e.g., Linux namespaces).

In one example embodiment, the app container 120 may be stored as one or more images that include the executable code and other data for the containerized software application of the app container 120. Each image in the app container 120 may include updates and changes to the software application. These images may be part of a union file system, and may be joined together by the container service 130, along with a base image, in order to generate the complete application package. The running app container 120 comprises this complete application package. An additional read-write layer also may be added by the container service 130 to the running app container 120, as the images are read only.

The security container(s) 150 may intercept communications from the app containers 120 for network security monitoring. As noted above, in a typical containerized environment, the container service 130 facilitates the connection of an app container 120 to the network 190. This connection may also be tunneled using an encryption protocol (e.g., secure sockets layer (SSL)). Due to this type of connection, intercepting the traffic of the app container 120 transparently is challenging. Furthermore, each container is self-contained, and as noted above, may be packaged as a read-only image. Thus, modifying the app container itself also may be undesirable.

Instead, the security container 150, which itself may be an app container, monitors the VM 115 (or container server 110 if the container environment is the container server 110 itself) to determine if any new app containers 120 are created. To monitor the container environment, the security container 150 may communicate with the container service 130 or request for and/or be given special administrative rights that allow it to query or determine the processes executing on the VM 115. When the security container 150 determines that a new app container 120 is created and connected to the virtual switch 135, the security container 150 may intercept the network traffic of the new app container 120 by moving the connection between the virtual switch 135 and the new app container 120 such that the connection may be made between the virtual switch 135 and the security container 150 instead. The security container 150 also may create a new connection between the new app container 120 and the security container 150. The security container 150 may also save and recover any existing routing entries during this process.

After performing this intercept operation, network traffic to and from the new app container 120 flows through the security container 150. The security container 150 may be able to monitor this traffic and inspect it to determine if a network security issue exists. The security container 150 may perform various actions on the traffic, such as forwarding it, making a copy of it, and so on. Although two security containers 150 are illustrated to intercept traffic in the two container servers 110, the container system 105 may include additional security containers 150. For example, each VM 115 may include one or more of the security containers 150 to monitor multiple app containers 120.

In addition, in some cases, the security container 150 supports network traffic load sharing, high availability features, a quarantine procedure, and zero-downtime upgrades. These additional aspects, as well as additional details regarding the security container 150, are described below with reference to FIGS. 2-6.

In one embodiment, the container system 105 also includes an analytics container 160 to analyze information received from the security containers 150. The analytics container 160 may request or receive longs and statistics from the security containers 150 regarding intercepted network traffic and other data. The analytics container 160 may analyze this information to produce various results. The container system 105 may also include one or more management containers 155 for configuration and monitoring of the security containers 150 in the container system 105. The management container 155 may configure the settings and rules for the security containers 150 and the analytics container 160 in the container system 105.

Additional details regarding other aspects of the container system 105 are described in related U.S. patent application Ser. No. 15/151,455, filed May 10, 2016, which is incorporated here by reference in its entirety.

Using the system described above, the security of a container environment (i.e., an environment supporting operating-system-level virtualization) may be monitored transparently without intrusion into the individual app containers and without modification to every single app container, as would be the case in a traditional approach. Furthermore, no specialized hardware or additional software components are required. Instead, a security container may discretely insert itself into the flow of network traffic between the app container and the outside network in the method described above, and is able to monitor traffic to and from the app containers.

Example Security Container of a Container System

Figure 2:
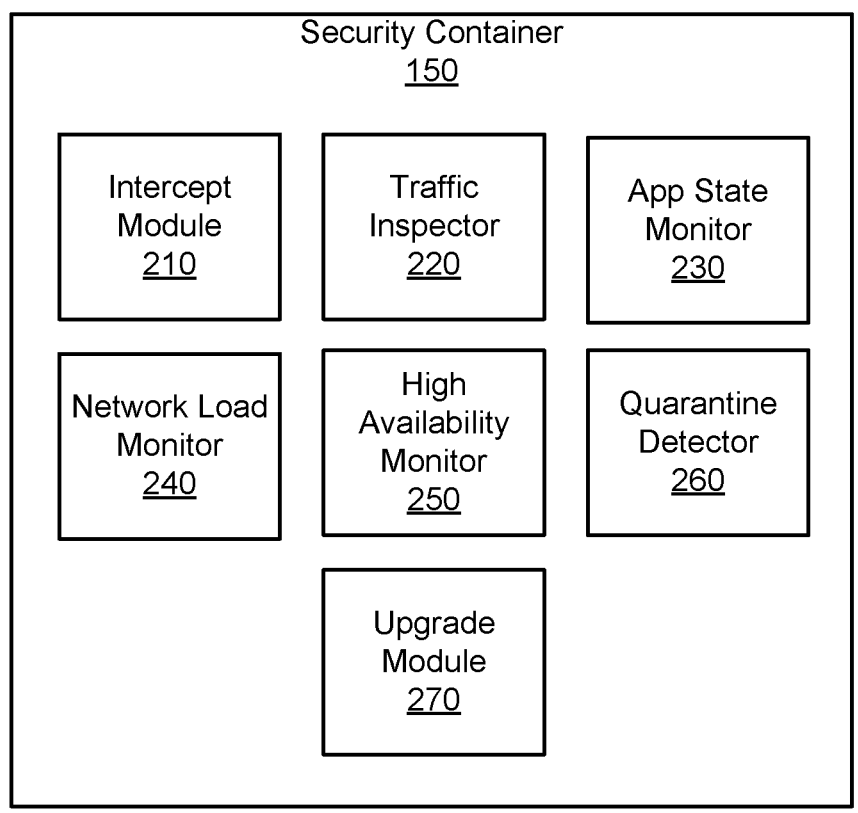
FIG. 2 illustrates the security container of FIG. 1, according to an example embodiment.

FIG. 2 illustrates the security container 150 of FIG. 1, according to an example embodiment. As illustrated, the security container 150 includes an intercept module 210, a traffic inspector 220, an app state monitor 230, a network load monitor 240, a high availability (HA) monitor 250, a quarantine detector 260, and an upgrade module 270. Although the illustrated security container 150 includes the elements shown in FIG. 2, in other embodiments the security container 150 may include different elements. Furthermore, the functionalities of each element may be distributed differently among the elements in other embodiments.

The app state monitor 230 monitors the status of app containers, such as the app containers 120, of a container environment (e.g., the VM or container server) on which the security container 150 is resident. In order to monitor the status of the app containers 120, the app state monitor 230 may utilize the APIs or other services of the container service 130. The app state monitor 230 may send a request to the container service 130 to determine the identification of the app containers 120 in the current container environment. Alternatively, the app state monitor 230 may communicate with the container service 130 to listen or observe for container related events, such as the creation or destruction of a container (e.g., container start and stop events).

In another embodiment, the app state monitor 230 uses system commands, such as a system call or a shell command such as "top," to monitor the processes created by the app containers 120. The app state monitor 230 may require elevated or special privileges within the container environment to execute these commands.

When the app state monitor 230 determines that an app container 120 is started or initiated, the app state monitor 230 may notify or cause the intercept module 210 to intercept the communications from the newly started app container 120 as described below.

In another case, the security container 150 is initiated in the container environment after one or more app containers 120 are already running in the environment. In this case, the app state monitor 230 may use commands provided by the container service 130 or using system commands as described above to determine the identity of the currently running app containers 120 and the information regarding their connections to the virtual switch 135. The app state monitor 230 may notify the intercept module 210 to intercept these running app containers 120.

In another case an app container 120 may be deactivated or stopped in a container environment. The app state monitor 230 may use the above methods to determine that the app container 120 has requested to be stopped, and may notify the intercept module 210 that the traffic from the app container 120 should no longer be intercepted.

In one embodiment, the app state monitor 230 may also monitor other information regarding the application containers 120, such as their performance, resources used, number of processes opened, number of file handles opened, number and status of network connections, and so on. The app state monitor 230 may determine this information using the API of the container service 130 or using system commands (e.g., "ss" for network connections in Linux). The app state monitor 230 may forward this information to the management container 155 or the analytics container 160.

The intercept module 210 intercepts connections between the app containers 120 and the virtual switch 135. When the intercept module 210 receives a notification from the app state monitor 230 that a particular app container 120 is initiated, the intercept module 210 determines, according to configuration rules, whether the traffic for that app container 120 should be intercepted. These rules may be determined by the intercept module 210 dynamically, or may be pre-configured.

The preconfigured rules may indicate that an app container 120 should be monitored if it is of a specific type, name, owner, or has some other characteristic. These characteristics may include the number and/or type of resources requested from the container service 130, such as a number of processor cycles, disk quota, network resources, memory resources, thread priority, security certificates, user privilege level, and so on.

To determine the rules dynamically, in one embodiment the intercept module 210 receives the app monitoring data from the app state monitor 230 as described above and determines whether a monitored parameter of the app container 120 is behaving outside of a normal statistical bounds. For example, the intercept module 210 may determine that the number of open network connections of the app container 120 is higher than a historical average for that type of app container 120 (the historical data may be received by the intercept module 210 from the management container 155). In such a case, the intercept module 210 may determine that the traffic from the app container 120 should be intercepted. The intercept module 210 may make this determination upon first receiving the notification from the app state monitor 230, or at a later time once the intercept module 210 determines that the app container 120 is exhibiting the abnormal behavior.

If the intercept module 210 determines that the traffic for the app container 120 should be intercepted, the intercept module 210 stores the routing entries of the app container 120 (e.g., in memory). These routing entries indicate the connections of the app container 120. For example, the routing entries may indicate various established connections, disconnected connections, stale connections, initializing connections, routing paths, ports used, and so on, for the app container 120. The intercept module 210 also stores the network address (e.g., IP address) of the app container 120.

To perform the interception of the connection, the intercept module 210 may switch the domain context to the app container 120. In other words, the intercept module 210 switches the current domain (e.g., the current namespace) to the domain of the app container 120. This allows the intercept module 210 to access the processes, network connections, and other resources of the app container 120.

In one embodiment, instead of switching domain contexts, the intercept module 210 may have elevated privileges within the container environment, and is able to directly modify the network connection data for the app container 120 via the underlying operating system of the container environment by executing one or more system commands.

The intercept module 210 removes the interface from the app container 120, and reconnects or binds the interface to the security container 150 instead. In one embodiment, the intercept module 210 determines the name of the interface for the app container 120 (e.g., "eth0") and moves this interface to the security container 150. The intercept module 210 may rename the interface (e.g., using system commands such as an API or CLI tool) to prevent conflicts with existing interfaces at the security container 150.

The intercept module 210 may notify the container service 130 that it is now using this interface, or may configure routing information within the container environment to indicate that the interface now is associated with the security container 150. For example, the intercept module 210 may issue a system command to bind a socket to the moved interface. After moving the connection, one port of the port pair of the connection is associated with the security container 150, while the other port pair remains with the virtual switch 135.

The intercept module 210 also may create a new connection between the app container 120 for which the intercept module 210 moved the original connection and the security container 150. The intercept module 210 may create the connection in the same fashion as the container service 130 (which may vary based on the type of container service used). For example, the intercept module 210 may create a connected port pair, with one port associated with the app container 120, and the other port associated with the security container 150. The intercept module 210 may use the API of the container service 130 to create this connection, may use the API of the container service 130 to create a standard connection between the app container 120 and the virtual switch 135 and then modify it to move the connection to the security container 150, or use system commands (such as creating a socket) to create the connection.

After establishing the new connection from the app container 120 to the security container 150 and to the virtual switch 135, the intercept module 210 assigns the original network address to the port associated with the app container 120, and restores the original routing entries that the intercept module 210 previously stored.

In this manner, the intercept module 210 may insert the security container 150 within the flow of the connection between the app container 120 and the virtual switch 135 in a transparent fashion. Since the connection with the virtual switch 135 may be dependent upon the implementation of the container environment (e.g., different operating systems or distributions may use different types of virtual switches), by leaving the connection with the virtual switch untouched, the intercept module 210 has the benefit of not necessarily having to know how to interface with the virtual switch 135 using commands that are compatible with the virtual switch 135. However, the intercept module 210 is not limited to such an embodiment, as with the proper knowledge of the virtual switch 135 architecture, the intercept module 210 can instead disconnect the connection from the virtual switch 135, connect this connection to the security container 150, and create a new connection from the security container 150 to the virtual switch 135.

Additionally, in one example embodiment, the intercept module 210 may maintain a single connection from the security container 150 to the virtual switch 135. When a new app container 120 is added to the container environment, the intercept module 210 intercepts the connection between the app container 135 and the virtual switch and moves it so that the connection is from the app container 135 to the security container 150. Although having a single connection to the virtual switch 135 may reduce certain flexibility, in some cases the intercept module 210 would have to perform routing functions in order to properly route the traffic from the multiple connections to the app containers 120 into a single connection to the virtual switch 135.

In some cases, an app container 120 may have multiple interfaces with multiple connections to the virtual switch 135 or to elsewhere. In such a case the intercept module 210 may perform the intercept process as described above for each interface of the app container 120. Thus, for every interface/connection of the app container 120 to the virtual switch 135, the intercept module 210 creates a connection between the app container 120 and the security container 150 and moves the connection between the app container 120 and the virtual switch 135 to the security container 150 similar to the process described above.

Although a particular process with technical details for intercepting the traffic from an app container 120 is described above, in other embodiments the technical details for creating and moving connections may differ from that described above depending upon the container environment (e.g., operating system, available tools and APIs). Thus, the description above is not limited to a particular set of technical details or tools, and may be implemented by one skilled in the art in differing container environments as well. Additionally, in one embodiment, the functionality of the intercept module 210 and the traffic inspector 220 are combined into a single module.

The traffic inspector 220 inspects traffic to and from the app containers 120 that have been intercepted by the intercept module 210. The traffic inspector 220 inspects any packets that have been sent or received for an app container 120 based on one or more rules. These rules may set criteria and indicate whether packets meeting these criteria should be forwarded or should be dropped. The criteria may be specific, or may be general. Specific criteria may indicate explicit characteristics of the packets, such as a source network address, a type of packet, the contents of a packet, the headers of a packet, and so on. These specific criteria may only match a small number of packets. General criteria may match a broader range of packets, and may indicate general characteristics of packets, such as ranges of addresses, ranges of sizes, and so on.

The rules may also be dynamic, such that they instruct the traffic inspector 220 to drop or keep packets based on a dynamic analysis of the contents of the packets. These rules may also indicate to the traffic inspector 220 to base such an analysis on the current as well as past packets, or on other trends in the data that is analyzed. For example, a rule may indicate that a packet should be dropped based on an analysis of a recent number of packets arriving from a particular source. If the number and format of those packets are very similar (e.g., a checksum indicates that the packet bodies are identical), then the rule may indicate to the traffic inspector 220 to drop the packet as it might be part of a denial of service attack. If no rule applies to the packet, the traffic inspector 220 may by default forward the packet or drop it. The rules may also include rules that allow the traffic inspector 220 to perform deep packet inspection, denial of service mitigation, anti-virus scanning, access control list policy control, application identification, firewall services, traffic encryption/decryption, and so on.

The traffic inspector 220 may in one embodiment allow all packets through a connection (e.g., as a "network tap"), while copying each packet and performing a security inspection on the packet based on the rules as described above. This allows the packet to be immediately forwarded to its destination without delay.

When inspecting the intercepted traffic, the traffic inspector 220 may also identify, using the packet's headers, whether the packet belongs to an existing session (e.g., a prior stream of packets). The traffic inspector 220 may associate the session with packet. Otherwise, the traffic inspector 220 may indicate a new session for this packet.

When a rule indicates that a packet should be dropped or forwarded, the traffic inspector 220 may log this instance, along with metadata for the packet, such as timestamp, source, destination, header information, associated rule, associated session, and so on. In some cases, the traffic inspector 220 may record more detailed information for packets which a rule indicates should be dropped rather than packets which are forwarded. The traffic inspector 220 may forward this logged information to the analytics container 160.

Network Traffic Load Sharing of the Security Container

The network load monitor 240 monitors the container system 105 for a set of conditions in a network load policy, which if met, indicate to the network load monitor 240 that additional resources (e.g., processing power) are required to handle the network traffic or other resource load of the app containers 120. If the network load monitor 240 determines that the conditions for additional resources are met, the network load monitor 240 initiates or activates a new security container 150.

The set of conditions, which if met, indicate additional resources are needed may include but are not limited to: 1) a threshold number of application containers in the container environment (e.g., 30 application containers), 2) a threshold processor and/or memory use in the container environment (e.g., 90% processor and/or memory use of the VM 115), 3) a threshold processor and/or memory use of the current security container 150 (e.g., 80% of allocated resources), 4) a threshold ingress and/or egress network traffic throughput or session rate of the container environment (e.g., greater than 100 MB/sec through the virtual switch 135), 5) network traffic types detected (e.g., via the virtual switch 135), 6) a range of network statistics or trends, 7) the service types of containers that are detected at run-time (e.g., database type containers detected), 8) pre-scheduled events that are to be executed, 9) an error occurring, and so on.

The network load monitor 240 may utilize various system commands and/or tools provided by the container service 130 in order to gather the information needed to determine if any of the conditions described above (or other conditions) is met. For example, the network load monitor 240 may use a system command to determine the current level of processor resources being used in the container environment, in order to determine if that level exceeds the threshold indicated in one of the conditions. As another example, the network load monitor 240 may transmit a request to the container service 130 to request information about a particular resource load. Additionally, the pre-configured conditions may further indicate to the network load monitor 240 regarding how many and/or which of the conditions should be met before the network load monitor 240 should activate the new security container 150. For example, the conditions may indicate to the network load monitor 240 that both a threshold processor use and a threshold network ingress throughput need to be reached before activating a new security container 150.

When the network load monitor 240 detects that these pre-configured conditions are met during periodic or continuous monitoring, the network load monitor 240 begins the process of initiating a new security container 150. This includes the startup of the new security container 150, and a determination of the network or resource load to transfer or share with the new security container 150.

To startup the new security container 150, the network load monitor 240 may activate the new security container 150 using the container service 130 of the container environment. For example, the network load monitor 240 may request the container service 130 to start a container image corresponding to a security container 150. As described above, each application container may be a combination of a base image, an image comprising the executable code of the application, and a read/write partition. The security container may be structured similarly, and thus to start a new security container 150, the network load monitor 240 may transmit a request to the container service 130 to initiate a new security container 150 using the image for the security container 150. The network load monitor 240 may set the resource allocation for the new security container 150 based on the amount of resources (currently) used within the container environment. For example, the network load monitor 240 may set the resources to be at least equal to half the amount of resources currently being used. While the network load monitor 240 may activate a single new security container 150, in one embodiment, configuration instructions may indicate to the network load monitor 240 to activate more than one security container 150, and may also indicate to activate the security container in a separate container environment (e.g., a different VM).

After the new security container 150 is initialized, the network load monitor 240 determines which network traffic and/or associated app containers 120 the new security container 150 should monitor based on a load sharing policy. This allows load, which has exceeded one of the pre-configured conditions, to be shared with or transferred to the new security container 150, thus dynamically balancing or lowering said load. The network load monitor 240 may categorize or receive indications of categories for various types of load on the container environment 105. In accordance with the load sharing policy, the network load monitor 240 may transfer or share these types of load with the new security container 150 based on the different categories of load. These categories of load may include but are not limited to 1) network traffic based on network address, network port, or traffic type, 2) app containers based on network traffic throughput ranges, 3) app containers based on pre-configured labels, 4) app containers based on application or service types of the app containers, and 5) app containers based on processor or memory usage ranges (e.g., app containers causing resource load in excess of a threshold). The network load monitor 240 may group traffic or app containers based on one or more of the above categories, and transfer or share the network traffic or other resource load (e.g., the app containers) from these categories of different loads with the new security container 150.

For example, if the network load monitor 240 categorizes the network traffic based on destination address, the network load monitor 240 may transfer the network traffic, and the associated app containers, with certain ranges of destination addresses to the new security container 150 such that the new security container 150 is able to monitor this transferred network traffic. The network load monitor 240 may also share some of this network traffic (e.g., approx. 50% of it) with the new security container 150. When transferring the load, the network load monitor 240 may transfer the app containers 120 associated with the network load, rather than actually transferring the network load itself.

To transfer network traffic or resource loads to the new security container 150, the network load monitor 240 may instruct or cause the new security container 150 to intercept the traffic from the app container 120 that is associated with the network traffic or resource loads that are to be transferred. The network load monitor 240 may do this by first disconnecting the associated app container 120 from the current security container 150 and reconnecting it to the virtual switch 135 directly, in the reverse of the intercept process described above, such that the new security container 150 may intercept the traffic from the app container 120 in the method described above.

Alternatively, the network load monitor 240 may disconnect the connection from the app container 120 to the current security container 150 and transmit the information for the ports for these connections to the new security container 150. The network load monitor 240 may do this by using system commands or API calls from the container service 130 (e.g., those commands and API calls described above) to disconnect the connection from the app container 120 and the connection from the virtual switch 135 and to cause the new security container 150 to connect to these ports such that the traffic from the app container 120 is now routed through the new security container 150.

The network load monitor 240 may also transmit the current network sessions belonging to the app container 120 that is being transferred to the new security container 150. Once the new security container 150 receives and inputs these sessions, the transfer of the sessions and connections is complete.

In some cases, the network load monitor 240 may also monitor for the reverse of the process described above, i.e., the network load monitor 240 may reduce the number of security containers 150 in the container environment (or the container system 105) in response to a separate set of conditions being met. These separate set of conditions may set separate lower bound thresholds for the conditions described above for adding security containers (e.g., processor usage falls below 50%). Alternatively, the network load monitor 240 may reduce the number of security containers 150 in response to no longer meeting the conditions described above for adding new security containers. If the network load monitor 240 determines that some condition is met such that security containers 150 should be removed, the network load monitor 240 may first determine which security container to remove 150 based on a set configuration (e.g., remove security containers that are monitoring a certain application type), based on a simple order (e.g., last in first out (LIFO) or first in first out (FIFO)), or based on some algorithm (e.g., remove the security container 150 with the least number of network connections, throughput, or app containers monitored). The network traffic and connections of the removed security container 150 are merged back into one or more of the remaining security containers 150 (e.g., the traffic could be moved into the original security container 150 from which the traffic was split from).

In one embodiment, the above process is performed over multiple security containers 150. In other words, one security container 150, or a separate management container, may monitor the status of multiple security containers 150 in the container system 105 to determine if any of the conditions are met. If so, the particular security container 150 or the management container may add or remove security containers 150 (e.g., within separate container environments) in the method described above.

High Availability Monitoring

The high availability (HA) monitor 250 monitors the health of security containers 150 and determines if a standby security container 150 should be activated upon detection of errors in a security container 150. The HA monitor 250 determines if the high availability feature or setting is enabled. In one embodiment, the high availability feature is enabled or disabled according to a policy. This policy may specify times of day, the existence of certain app containers, the amount and types of traffic being monitored, and other conditions upon which the high availability feature is set to be enabled (or disabled).

If the high availability feature is enabled, the HA monitor 250 creates or instructs the container service 130 to create one or more additional standby security containers 150. The HA monitor 250 connects, or instructs the container service 130 to connect, these standby security containers 150 to the virtual switch 135. However, these standby security containers 150 are in a standby mode whereby they do not intercept any network traffic. Instead, network traffic continues to flow through the primary security container 150 (i.e., the existing security container which caused the creation of the standby security containers 150). In one embodiment, the HA monitor 250 also synchronizes the network sessions of the primary security container with each standby security container 150, and may continuously update these sessions in the standby security container 150.

When the HA monitor 250 determines that the primary security container 150 is in an error or failure state from which it cannot recover, the HA monitor 250 selects one or more of the standby security containers as the new primary security container 150. To detect the error condition, the HA monitor 250 may monitor logs for the primary security container 150 to determine if any errors are logged. The HA monitor 250 may perform a network test, e.g., a ping, to determine whether an error has occurred in the network connection for the security container 150. The HA monitor 250 may query the container service 130 regarding the status of the security container 150 to determine if an error has occurred. The HA monitor 250 may cause the security container 150 to maintain a heartbeat signal, and determine that an error has occurred when the heartbeat signal fails. Although the HA monitor 250 is described as part of the security container 150, it may run in a separate thread, process, or even container so that it has a degree of isolation from the security container 150 and is not affected directly by the error in the security container 150. Alternatively, the HA monitor 250 of a standby security container 150 monitors the condition of the primary security container 150 for an error condition.

The HA monitor 250 may initiate one or more steps to attempt to recover from the error condition in the primary security container 150. The HA monitor 250 may initiate a recovery process on the primary security container 150. This recovery process may be a partial restart of the security container 150, a cache clearing activity, an integrity check and repair, and so on. The HA monitor 250 may also wait for a certain period of time to see if the error condition (e.g., no heartbeat) is resolved automatically (e.g., via an automatic recovery process). The HA monitor 250 may perform some other recovery process based on a configuration or rule (e.g., kill an unresponsive thread of the security container 150 using a system command when the error condition indicates a hang).

If the HA monitor 250 cannot recover the security container 150, the HA monitor 250 causes the standby security container(s) to become the primary security container 150 (either via system commands or the container service 130). During this process, the HA monitor 250 transfers any remaining network sessions from the primary security container 150 to the standby security container 150, and all network connections between the app containers 150 and the primary security container 150, as well as the network connections between the primary security container 150 and the virtual switch 135, are transferred by the HA monitor 250 to the standby security container(s) 150. The HA monitor 250 may transfer the network connections using the container service 130, similar to the way in which the security container 150 transfers the network connections for network load sharing as described above.

After the transfer is complete, the HA monitor 250 of the new primary security container 150 (which was the previous standby security container 150) deactivates and removes the old primary security container 150 that is in the error state (e.g., using the container service 130). The HA monitor 250 may then create a new standby security container 150 (or containers) in a similar fashion to the method described above.

Quarantining in the Security Container

The quarantine detector 260 quarantines network traffic from certain app containers if suspicious activity is detected. When detecting suspicious activity, the quarantine detector 260 may monitor the traffic to and from each app container 120, as well as the behavior of the app containers 120 themselves in some cases, to compare the traffic (and/or behavior) with the rules of a quarantine policy to see if any of the rules are violated. When these rules are violated, the quarantine detector 260 may indicate that a suspicious activity is detected. These rules may be based on an analysis of the characteristics of the network traffic, which may include but are not limited to an amount, number, type, rate, packet type, packet header information, source app or address, destination app or address, and protocol of the network traffic. A rule may specify particular combination characteristics of network traffic that are likely to be indicative of suspicious network activity. These rules may also be based on the behavior of an app container 120, such as files accessed, threads opened, resources used, and so on. To monitor the behavior of an app container 120, the quarantine detector 260 may need to gain elevated or special privileges in the container environment.

These particular characteristics may further be defined by threshold values, with network traffic having characteristics exceeding these threshold values being suspicious. The set of these rules may comprise a quarantine policy for the container system 105.

The characteristics and threshold values for the rules may be determined by analyzing network traffic over time, with the characteristics and values of network traffic that is deemed suspicious or unusual recorded. The determination that traffic is suspicious or unusual may be made automatically by the quarantine detector 260 based on knowledge of past traffic patterns, or may be made by a user. The characteristics (and their values) during these unusual or suspicious periods may be recorded by the quarantine detector 260 and associated with rules.

If the quarantine detector 260 determines that some network traffic violates a rule, the quarantine detector 260 determines whether a new security container 150 acting to quarantine the suspicious network traffic should be created. The quarantine detector 260 may make this determination based on an additional set of rules (e.g., quarantine creation rules). These additional rules may specify app containers with particular labels or of particular types that should be quarantined in a separate security container. The quarantine detector 260 may instead quarantine by default all app containers associated with suspicious activity. Alternatively, the quarantine detector 260 may transmit a request to a management container to determine whether to enable a new security container 150. The management container may correlate the reported traffic from multiple quarantine detectors 260 on multiple security containers 150 to determine that quarantine should be enabled.

Once the quarantine detector 260 determines that quarantine should be enabled and a new security container 150 should be activated for the suspicious network traffic, the quarantine detector 260 uses system commands or the container service 130 to activate a new security container 150 (e.g., using the image of the security container) in a quarantine mode. The quarantine mode of a security container 150 may be similar to a regular security container 150, however when in the quarantine mode the quarantine detector 260 of the security container 150 may perform additional detailed logging, may store some or all packets or data from the network traffic, may throttle network traffic to reduce load (e.g., in a denial of service attack), may allow a limited number of connections, may perform a deep scan of all traffic (e.g., deep packet inspection), may log additional alerts and warnings, and may perform other network security processes beyond the normal process but which are activities typical of a quarantine process.

The quarantine detector 260 transmits to the new quarantine mode security container 150 a list of all the network traffic with particular characteristics that should be quarantined. This may be the traffic that triggered the quarantine policy. For example, this might be all network traffic of a set of app containers 120, network traffic arriving at a particular network destination, network traffic with particular network address and port combinations, and so on. In one embodiment, the quarantine detector 260 may disconnect the network connections with the particular characteristics and transfer these connections to the new security container 150 (in a method similar to that described above).

The quarantine detector 260 on the new security container 150 under quarantine mode may perform various additional actions as described above. For example, the quarantine detector 260 may log every packet in the network traffic that it monitors. The additional information gathered by the quarantine detector 260 may be used by a user or an analytics container to determine a pattern or other higher level characteristic of the suspicious traffic.

Zero-Downtime Upgrade of the Security Container

The upgrade module 270 upgrades the software version of a security container 150 while avoiding or minimizing any downtime. During the operation of the security container 150, the software version of the security container 150 may be upgraded due to new features or bug fixes. In such a case, it is desirable to be able to upgrade the security container 150 to the new version without disrupting its operations, i.e., a zero-downtime upgrade. This keeps the monitoring of the network traffic continuous and provides the advantage of continuous protection even during upgrades.

The upgrade module 270 initially receives an indication to perform the upgrade. The upgrade module 270 uses system commands or the container service 130 to start a new security container 150 (as described above) with an image of the security container that has been upgraded to the new version. The upgrade module 270 may query a repository to determine the most recent version of the security container 150 that is compatible with the current container environment, or may be provided with the location of the new image. During the activation or initialization of the new security container, the current security container 150 continues to monitor network traffic 150 (in the method described above).

Alternatively, the upgrade module 270 may regularly query a repository for the latest version of the security container 150, and upon determining that a new version exists, the upgrade module 270 consults (or performs a check against) an upgrade policy to see if an upgrade should occur. This policy may indicate the version types (e.g., stable, beta, etc.) that should be used, and/or may indicate an upgrade schedule (e.g., upgrade only once a week). Based on this upgrade policy, the upgrade monitor 270 may determine that an upgrade should be performed. In such a case, the upgrade monitor 270 activates a new upgraded security container 150 as described above.

Once the upgraded security container 150 is running, the upgrade module 270 transfers the network connections and sessions from the current security container 150 to the new upgraded security container 150 (in a method similar to that described above for transferring network connections and session between security containers). Subsequently, the upgrade module 270 for the old security container 150 with the old image version deactivates the old security container via system commands or the container service 130.

This allows for a smooth upgrade with only a minor disruption in network traffic while the network connections and sessions are transferred. In addition, the upgrade module 270 may intelligently transfer network sessions and connections, such that the upgrade module 270 selectively transfers those sessions and connections when they are idle, or momentarily idle, to the new security container 150. In this way, the transfer is completely transparent to an app container 150 and to other entities connected to the app container 150.

Honey Pot in Security Container

In some network scenarios the security container 150 may act as a honey pot. A honey pot is a network target that appears to be a legitimate network target for which an attacker or other malicious entity may wish to target and compromise. However, any data or characteristics of the honey pot may be simulated, and any actual attack made on the honey pot would not result in compromise of any information or undesired reduction in hardware resources for the entity associated with the honey pot. Furthermore, any network traffic to these honey pots may be monitored in higher detail (e.g., each packet of the traffic may be stored instead of just logged).

The security container 150, in some embodiments, creates a honey pot target to allow potential attackers to be baited into attacking the honey pot. This honey pot may represent an app container 120 with simulated data, a management container, a security container, or any other container on the system. To simulate an app container 120 for a honey pot, the security container 150 may execute an image of the app container in a sandbox, and populate it with data that appears to be realistic. This realistic data may be provided by a user, or may based on a modified version of real data with any sensitive information replaced with simulated information. The app container of the honey pot may respond in a realistic way, but may report various errors or time out when an attacker attempts to exploit the app container to access resources that have not been simulated, and which may be too sensitive or too difficult to simulate.

The security container 150 may log any traffic with this honey pot, and report the information to a user or to a management container. The security container 150 may create multiple honey pots, with each representing a different simulated target.

Example Flows

Figure 3:
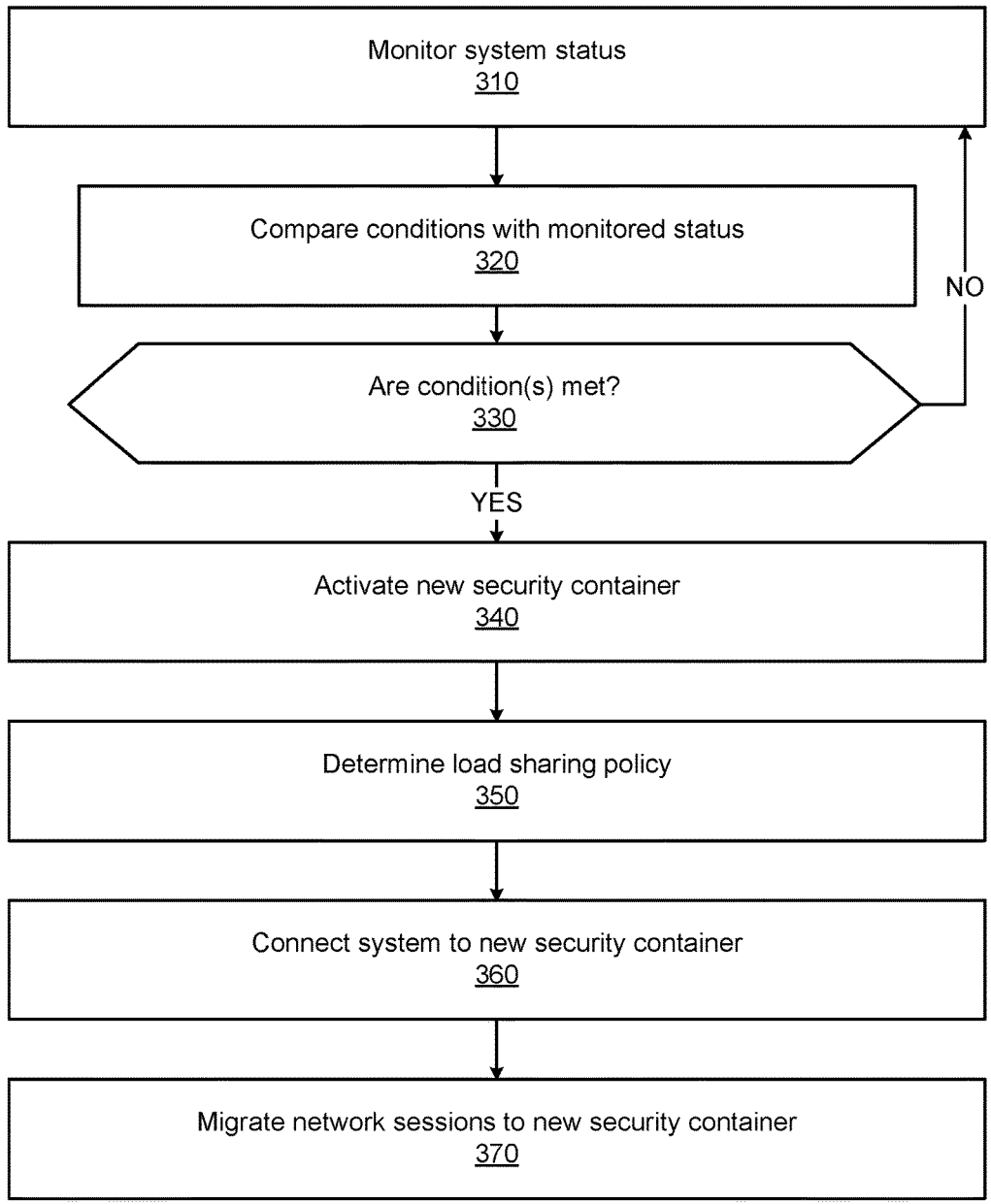
FIG. 3 is a flow chart illustrating an exemplary method for activating a new security container in response to network load, according to an example embodiment.

FIG. 3 is a flow chart illustrating an exemplary method 300 for activating a new security container in response to network load, according to an example embodiment. In one embodiment, FIG. 3 attributes the steps of the method 300 to the security container 150 (e.g., the network load monitor 240). However, some or all of the steps may be performed by other elements. In addition, some embodiments may perform the steps in parallel, perform the steps in different orders, or perform different steps. Also, it is noted that in one example embodiment the steps and/or modules may be embodied as instructions, e.g., instructions 724, that may be executed by the processor 702 described with respect to FIG. 7.

The security container 150 monitors 310 the status of the container system for a set of conditions of a network load policy indicating whether a new security container should be activated due to an increase in the use of resources, such as network resources or hardware resources. As noted above, these conditions may set a threshold (e.g., 90% of allocated processor resources for the container) such that the security container 150 compares 320 the conditions with the monitored status to determine whether any of the threshold values are exceeded, i.e., a condition is met.

If a condition is not met 330, the security container 150 continues monitoring 310 the container system. Alternatively, if the condition is met 330, the (existing) security container 150 activates 340 a new security container. For example, if the security container 150 determines that 91% of allocated processor resources for the security container 150 are used, and the condition indicates 90% of allocated processor resources for the security container 150, the security container 150 activates a new security container.

The security container 150 also determines 350 the load sharing policy to determine the load (e.g., excess network traffic and/or app containers) that should be newly associated with the new security container. The load from the excess network traffic and/or app containers is transferred to the new security container. The security container 150 determines which load to transfer based on the information in the load sharing policy. For example, the load sharing policy may indicate that app containers causing processor (or other resource) load exceeding a certain percentage should be moved to the new security container. Thus, if the last app container to be connected to the security container causes a 24% processor load, and the current processor load minus the load from this app container is at 45%, and the policy indicates that any load in excess of 50% should be transferred, then the app container that is causing the 24% load is to be transferred to be associated with the new security container.

The security container 150 connects 360 the system to the new security container. To do this, the security container 150 may reconnect the connections from the app containers that are to be transferred in accordance with the network policy from the current security container 150 to the new security container. The security container 150 also migrates 370 the network sessions from the current security container 150 to the new security container. The reconnection and migration of the network connections and sessions are described above in further detail.

Figure 4:
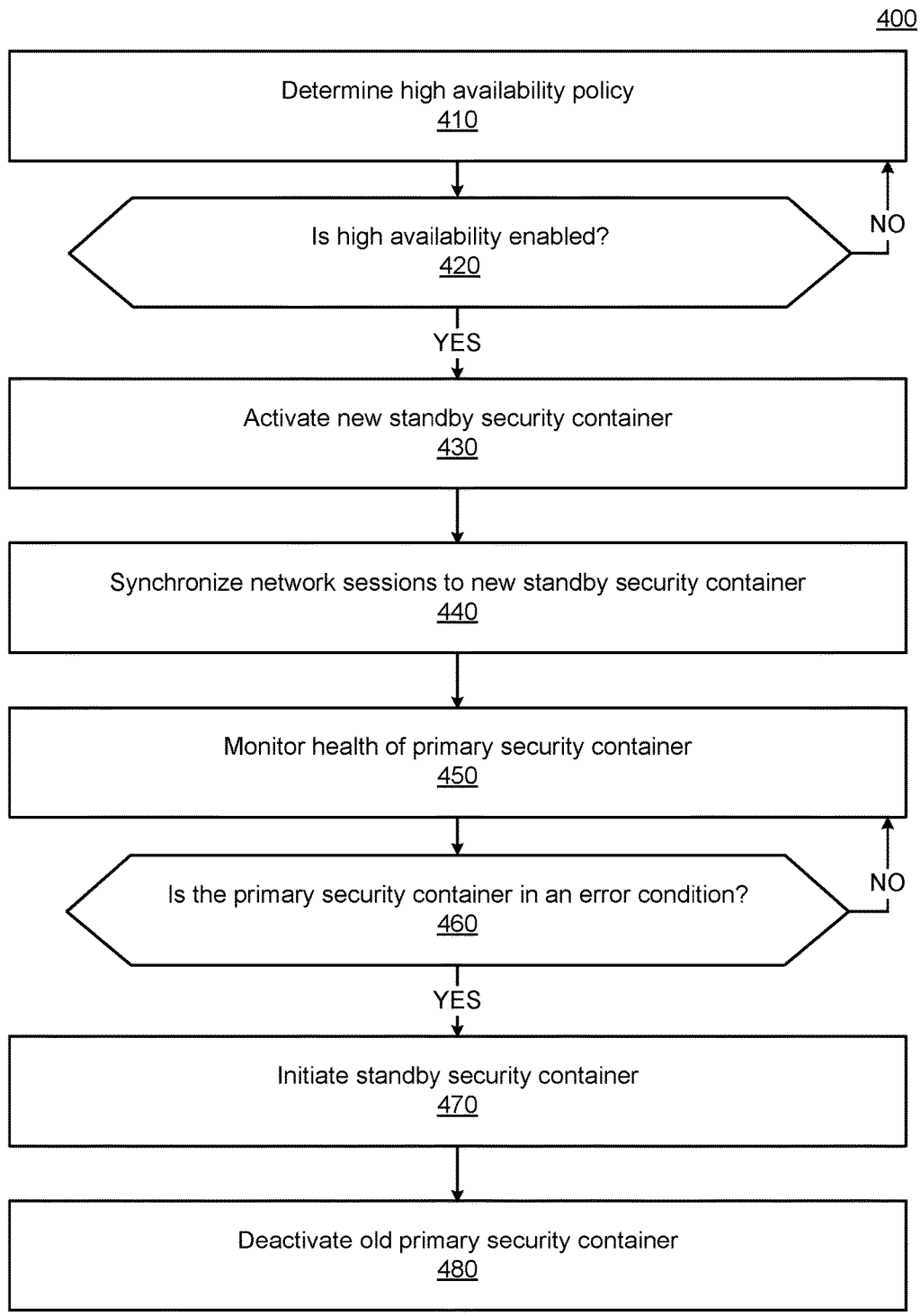
FIG. 4 is a flow chart illustrating an exemplary method for high availability for security containers, according to an example embodiment.

FIG. 4 is a flow chart illustrating an exemplary method 400 for high availability for security containers, according to an example embodiment. In one embodiment, FIG. 4 attributes the steps of the method 400 to the security container 150 (e.g., the high availability monitor 250). However, some or all of the steps may be performed by other elements. In addition, some embodiments may perform the steps in parallel, perform the steps in different orders, or perform different steps. Also, it is noted that in one example embodiment the steps and/or modules may be embodied as instructions, e.g., instructions 724, that may be executed by the processor 702 described with respect to FIG. 7.

The security container 150 determines 410 the high availability policy. The high availability policy may indicate that the high availability (HA) feature is enabled or disabled. If the policy indicates that HA is disabled 420, the security container 150 continues to monitor to determine 410 whether the HA feature is enabled. Otherwise, if the HA feature is enabled 420, the (existing) security container 150 activates 430 a new standby security container, with the original security container 150 being the primary security container 150. The security container 150 synchronizes 440 the current network sessions with the standby security container such that the standby security container may be quickly exchanged for the primary security container 150.

The primary security container 150 continues to monitor 450 the health of the primary security container 150 (i.e., monitor itself). If the primary security container 150 is not in an error condition 460, the primary security container 150 continues to monitor the health of the primary security container 150. If the primary security container 150 determines that the primary security container 150 is in an error condition 460 (e.g., a failure condition is logged by the primary security container 150), then the primary security container 150 initiates 470 the standby security container as the new primary security container and deactivates 480 itself.

Figure 5:
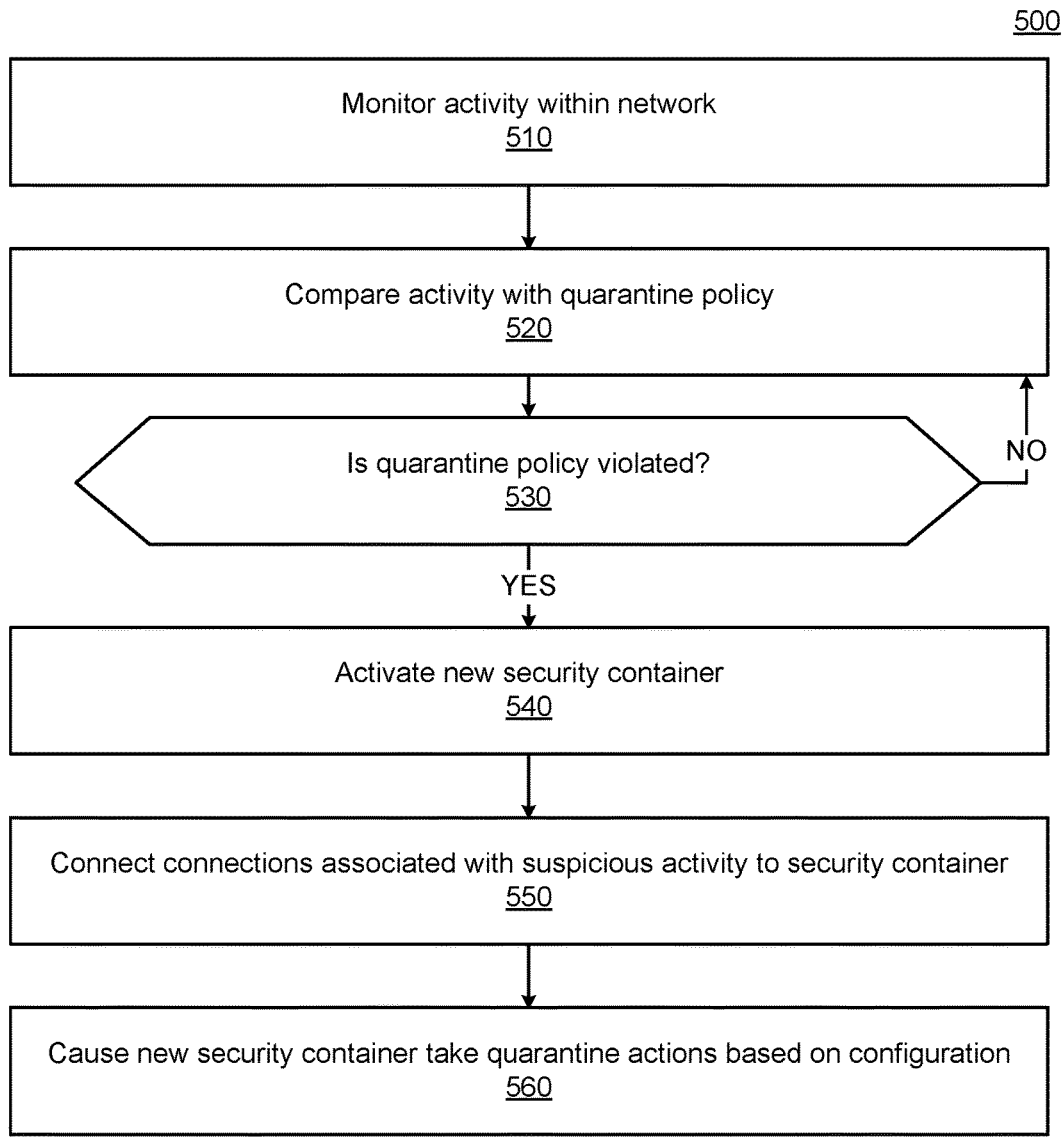
FIG. 5 is a flow chart illustrating an exemplary method for quarantine detection for security containers, according to one embodiment.

FIG. 5 is a flow chart illustrating an exemplary method 500 for quarantine detection for security containers, according to an example embodiment. In one embodiment, FIG. 5 attributes the steps of the method 500 to the security container 150 (e.g., the quarantine detector 260). However, some or all of the steps may be performed by other elements. In addition, some embodiments may perform the steps in parallel, perform the steps in different orders, or perform different steps. Also, it is noted that in one example embodiment the steps and/or modules may be embodied as instructions, e.g., instructions 724, that may be executed by the processor 702 described with respect to FIG. 7.

The security container 150 monitors 510 activity within the network. This includes network traffic to and from app containers. The security container 150 compares 520 the activity with a quarantine policy. As described above, the quarantine policy may include one or more rules that are based on the characteristics of the network traffic, such as an amount of traffic or a type of the traffic. For example, a rule may indicate that traffic of a type DNS beyond a certain rate from a single network source may be suspicious activity.

When the security container 150 determines that the quarantine policy is not violated 530 in the comparison, the security container 150 continues to monitor 510 the activity within the network. Alternatively, when the security container 150 determines that the quarantine policy is violated 530, the (existing) security container 150 activates 540 a new security container.

After activating the new security container, the original security container 150 connects 550 the connections associated with the suspicious activity to the new security container. The original security container 150 may disconnect the same connections from the original security container 150. The original security container 150 causes 560 the new security container to take various quarantine actions against the connections that were connected to the new security container based on a configuration. This configuration may put the new security container in a quarantine mode, whereby it performs additional actions against the network traffic it monitors. For example, it may log and store all packets it intercepts, rather than only logging these packets.

Figure 6:
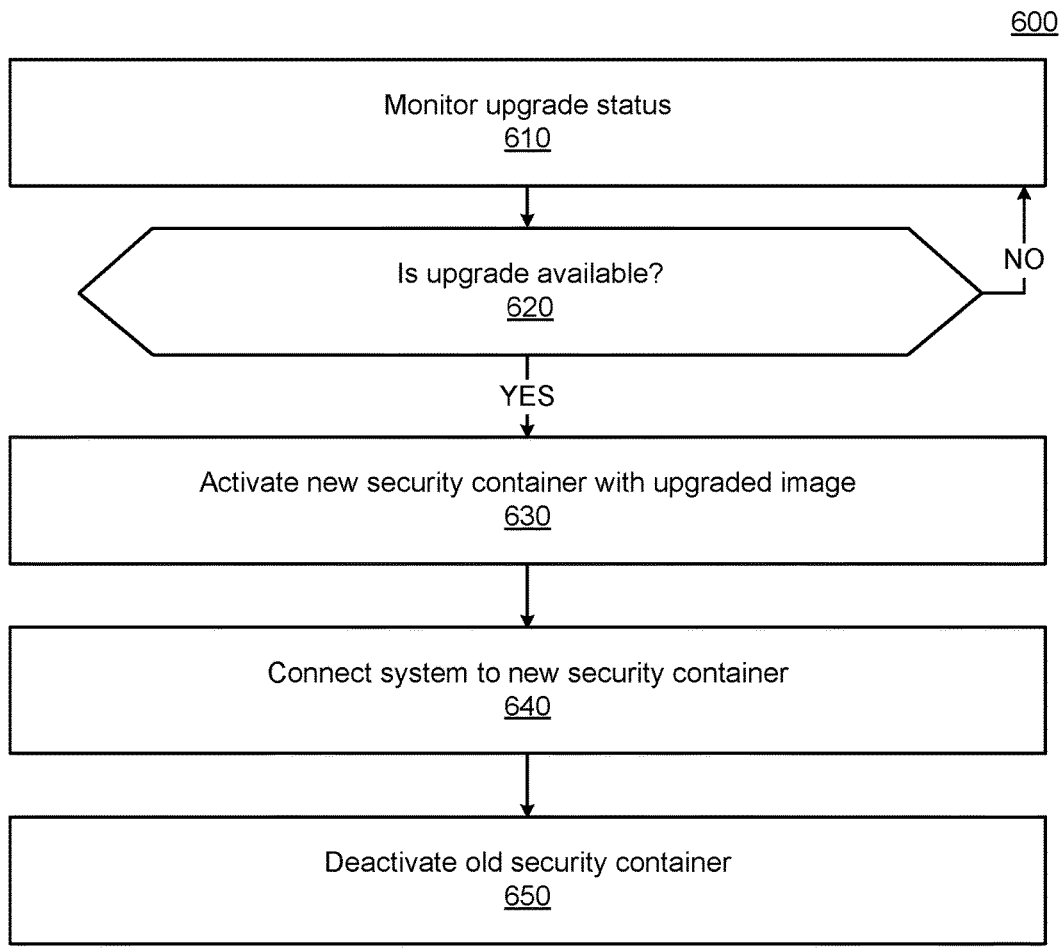
FIG. 6 is a flow chart illustrating an exemplary method for zero-downtime upgrade for security containers, according to an example embodiment.

FIG. 6 is a flow chart illustrating an exemplary method 500 for zero-downtime upgrade for security containers, according to an example embodiment. In one embodiment, FIG. 6 attributes the steps of the method 600 to the security container 150 (e.g., the upgrade module 270). However, some or all of the steps may be performed by other elements. In addition, some embodiments may perform the steps in parallel, perform the steps in different orders, or perform different steps. Also, it is noted that in one example embodiment the steps and/or modules may be embodied as instructions, e.g., instructions 724, that may be executed by the processor 702 described with respect to FIG. 7.

The security container 150 monitors 610 the upgrade status of the security container 150. For example, the security container 150 may check a version number in a repository to see if it is different from the current version number of the security container 150 itself. If the security container 150 determines that no upgrade is available 620, the security container 150 continues monitoring 610 the upgrade status for the security container 150. If the security container 150 determines that an upgrade is available, the (existing) security container 150 activates 630 a new security container with the upgraded image. This upgraded image is of the updated version number. The security container 150 connects 640 the container system to the new security container, copying any network sessions and/or connections from the original security container 150 to the new security container. At this point, the new security container includes all the connections from the original security container 150.

Subsequently, the security container 150 deactivates itself, such that the new security container continues to operate. To outside entities such as app containers connected to the security container 150, the switch is seamless and with no (or very minor) interruptions.

Example Machine Architecture

FIG. 7 is a block diagram illustrating components of an example machine able to read instructions from a machine-readable medium and execute them in a processor (or controller). Specifically, FIG. 7 shows a diagrammatic representation of a machine in the example form of a computer system 700. The computer system 700 can be used to execute instructions 724 (e.g., program code or software) for causing the machine to perform any one or more of the methodologies (or processes) described herein. The methodologies described above also may include the operations described through modules and components, e.g., in FIGS. 1 and 2. In addition, it is noted that in alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. In sum, the computer system 700 may be configured to execute the processes and functionality described in FIGS. 1-6.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704 and the storage unit 716 communicate via a bus 708.

In addition, the computer system 706 can include a static memory 706, a display driver 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The system as disclosed provides benefits and advantages that include the ability to transparently monitor the security of a containerized system without having to intrude upon every single application container.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-6. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., 702) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software (e.g., instruction 724) to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors 702 or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 704). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for transparent network security monitoring in a container environment through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
monitoring, at an existing security container, a resource load in a container environment, the container environment including a container service providing operating system-level virtualization for one or more application containers connected to a virtual switch within the container environment, the one or more application containers having their traffic intercepted by the security container for inspection;

activating, in response to determining that the monitored resource load meets a condition in a network load policy, a new security container;

determining a subset of the one or more application containers to be associated with the new security container by identifying as the subset of the one or more application containers, one or more application containers based on a load sharing policy, the load sharing policy identifying application containers based on one or more categories of resource load associated with the application container; and transferring the network connections and network sessions of the subset of the one or more application containers to the new security container.

2. The method of claim 1, wherein the resource load comprises at least one of a number of application containers executing in the container environment, an amount of processor and memory use in the container environment, and an amount of network traffic in the environment.

3. The method of claim 1, wherein the determining a subset of the one or more application containers to be associated with the new security container further comprises:

identifying as the subset of the one or more application containers, one or more application containers associated with the resource load that caused the condition to be met.

4. The method of claim 1, wherein the transferring the network connections and network sessions of the subset of the one or more application containers further comprises:

identifying one or more network connections associated with the subset of application containers, each application container having a first network connection between the application container and the security container, and a second network connection between the security container and the virtual switch;

identifying one or more network sessions associated with the subset of application containers;

disconnecting the identified network connections from the existing security container;

transmitting information for the identified network connections to the new security container to cause the new security container to connect to the identified network connections; and transmitting information for the identified network sessions to the new security container.

5. The method of claim 1, further comprising:

determining, at the existing security container, that a high availability (HA) policy indicates that HA is enabled;

activating a new standby security container;

synchronizing one or more network sessions of the existing security container with the new standby security container;

initializing the new standby security container as a primary security container in response to determining that the existing security container is in an error condition; and deactivating the existing security container.

6. The method of claim 5, wherein the new standby security container is initialized in further response to determining that a recovery operation for the existing security container has failed.

7. The method of claim 1, further comprising:

determining, at the existing security container, that an intercepted suspicious network activity violates a quarantine policy;

activating a new security container in quarantine mode; and transferring one or more network connections and network sessions of application containers associated with the suspicious network activity to the new security container.

8. The method of claim 7, wherein the quarantine mode causes the new security container to log information about intercepted network traffic with a higher level of detail.

9. The method of claim 1, further comprising:

determining, at the existing security container, that an upgrade is available for the existing security container;

activating a new security container with an upgraded image;

transferring the network connections and network sessions of the existing security container to the new security container.

10. A non-transitory computer storage readable medium comprising stored instructions, the instructions when executed by a processor cause the processor to:

monitor, at an existing security container, a resource load in a container environment, the container environment including a container service providing operating system-level virtualization for one or more application containers connected to a virtual switch within the container environment, the one or more application containers having their traffic intercepted by the security container for inspection;

activate, in response to a determination that the monitored resource load meets a condition in a network load policy, a new security container;

determine a subset of the one or more application containers to be associated with the new security container by:

identifying as the subset of the one or more application containers, one or more application containers based on a load sharing policy, the load sharing policy identifying application containers based on one or more categories of resource load associated with the application container; and transfer the network connections and network sessions of the subset of the one or more application containers to the new security container.

11. The non-transitory computer storage readable medium of claim 10, wherein the resource load comprises at least one of a number of application containers executing in the container environment, an amount of processor and memory use in the container environment, and an amount of network traffic in the environment.

12. The non-transitory computer storage readable medium of claim 10, wherein the instructions that when executed causes the processor to transfer of the network connections and network sessions of the subset of the one or more application containers further comprises instructions that when executed cause the processor to:

identify one or more network connections associated with the subset of application containers, each application container having a first network connection between the application container and the security container, and a second network connection between the security container and the virtual switch;

identify one or more network sessions associated with the subset of application containers;

disconnect the identified network connections from the existing security container;

transmit information for the identified network connections to the new security container to cause the new security container to connect to these network connections; and transmit information for the identified network sessions to the new security container.

13. The non-transitory computer storage readable medium of claim 10, having further comprising instructions that when executed cause the processor to:

determine, at the existing security container, that a high availability (HA) policy indicates that HA is enabled;

activate a new standby security container;

synchronize one or more network sessions of the existing security container with the new standby security container;

initialize the new standby security container as a primary security container in response to determining that the existing security container is in an error condition; and deactivate the existing security container.

14. The non-transitory computer storage readable medium of claim 13, wherein the instructions that causes the processor to activate the new standby security container, further comprises instructions that when executed cause the processor to initialize the new standby security container in further response to determining that a recovery operation for the existing security container has failed.

15. The non-transitory computer storage readable medium of claim 10, further comprising instructions that when executed cause the processor to:

determine, at the existing security container, that an intercepted suspicious network activity violates a quarantine policy;

activate a new security container in quarantine mode; and transfer one or more network connections and network sessions of application containers associated with the suspicious network activity to the new security container.

16. The non-transitory computer storage readable medium of claim 15, wherein the quarantine mode causes the new security container to log information about intercepted network traffic with a higher level of detail.

17. The non-transitory computer storage readable medium of claim 10, further comprising instructions that when executed cause the processor to:

determine, at the existing security container, that an upgrade is available for the existing security container;

activate a new security container with an upgraded image; and transfer the network connections and network sessions of the existing security container to the new security container.

\* \* \* \* \*